(12) United States Patent
Zhou

(10) Patent No.: US 12,349,252 B2
(45) Date of Patent: Jul. 1, 2025

(54) DRIVE CIRCUIT, LIGHT-EMITTING CIRCUIT AND DISPLAY DEVICE

(71) Applicant: HKC CORPORATION LIMITED, Shenzhen (CN)

(72) Inventor: Renjie Zhou, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 430 days.

(21) Appl. No.: 18/064,479

(22) Filed: Dec. 12, 2022

(65) Prior Publication Data

US 2023/0328858 A1    Oct. 12, 2023

(30) Foreign Application Priority Data

Apr. 8, 2022   (CN) .................... 202210363851.7

(51) Int. Cl.
*H05B 45/32* (2020.01)
*H05B 45/14* (2020.01)

(52) U.S. Cl.
CPC ............. *H05B 45/32* (2020.01); *H05B 45/14* (2020.01)

(58) Field of Classification Search
CPC ............................... H05B 45/15; H05B 45/32
See application file for complete search history.

(56) References Cited

U.S. PATENT DOCUMENTS

2020/0037408 A1*  1/2020  DeJonge .............. H05B 45/382

FOREIGN PATENT DOCUMENTS

| CN | 207545070 U | 6/2018 | |
|---|---|---|---|
| CN | 114079377 A | 2/2022 | |
| CN | 114115807 A | 3/2022 | |
| CN | 114499181 A | 5/2022 | |
| JP | 2001286127 A | 10/2001 | |
| JP | 2005045850 A | 2/2005 | |
| JP | 2005051883 A * | 2/2005 | |
| JP | 2005109902 A | 4/2005 | |
| WO | WO-2009119619 A1 * | 10/2009 | ......... H05B 33/0803 |

OTHER PUBLICATIONS

JP2005-051883A Machine Translation. (Year: 2005).*

(Continued)

*Primary Examiner* — Alexander H Taningco
*Assistant Examiner* — Pedro C Fernandez
(74) *Attorney, Agent, or Firm* — Westbridge IP LLC

(57) ABSTRACT

Disclosed are a drive circuit, a light-emitting circuit and a display device. The drive circuit is connected to a load element. The drive circuit includes a switch power supply circuit for boosting or reducing a first voltage; a feedback circuit for receiving a feedback voltage of the load element, and generating a control signal in response that the feedback voltage is not within a preset voltage range; a pulse circuit for generating a switch signal with a first preset frequency; and a switch circuit. The switch circuit is for transmitting the control signal to the control end of the switch tube in response to receiving the control signal, and the switch circuit is for transmitting the switch signal to the control end of the switch tube in response to not receiving the control signal.

15 Claims, 5 Drawing Sheets

(56) References Cited

OTHER PUBLICATIONS

International Search Report and Written Opinion issued in corresponding PCT Application No. PCT/CN2022/135757, dated Feb. 9, 2023.
First Office Action issued in counterpart Chinese Patent Application No. 202210363851.7, dated May 23, 2022.
Notification to Grant Patent Right for Invention issued in counterpart Chinese Patent Application No. 202210363851.7, dated Jun. 10, 2022.

\* cited by examiner

DRIVE CIRCUIT, LIGHT-EMITTING CIRCUIT AND DISPLAY DEVICE

CROSS-REFERENCE TO RELATED APPLICATIONS

This application claims priority to Chinese Patent Application No. 202210363851.7, filed on Apr. 8, 2022, the entire contents of which is incorporated herein by reference.

TECHNICAL FIELD

The present disclosure relates to the field of display technology, and in particular, to a drive circuit, a light-emitting circuit and a display device.

BACKGROUND

In the electronic circuit, the stability of the voltage or current of the load is extremely important. For example, for a light-emitting element, the stability of voltage or current can make the light-emitting element emit light uniformly. In some display devices, the backlight voltage or current of the mini light-emitting diode (LED) is prone to fluctuate, resulting in uneven brightness of the mini LED. Therefore, how to provide a stable voltage or current for the load is an urgent technical problem to be solved.

SUMMARY

The main objective of the present disclosure is to provide a drive circuit, a light-emitting circuit and a display device, aiming to solve the technical problem of unstable voltage or current provided to light-emitting elements such as mini LEDs in the related art.

In order to solve the above objective, the present disclosure provides a drive circuit, connected to a load element. The drive circuit includes: a switch power supply circuit for boosting or reducing a first voltage to obtain a second voltage, and supplying the second voltage to the load element; a feedback circuit connected to the load element, for receiving a feedback voltage of the load element, and generating a control signal in response that the feedback voltage is not within a preset voltage range; a pulse circuit for generating a switch signal with a first preset frequency; and a switch circuit respectively connected to the feedback circuit, the pulse circuit and a control end of a switch tube in the switch power supply circuit. The switch circuit is for transmitting the control signal to the control end of the switch tube in response to receiving the control signal, the switch circuit is for transmitting the switch signal to the control end of the switch tube in response to not receiving the control signal, the control signal is for controlling the switch tube to be in an on state or an off state, and the switch signal is for controlling the switch tube to switch between the on state or the off state according to a second preset frequency.

In an embodiment, the load element is a light emitting diode (LED) or a mini-LED component.

In an embodiment, an output end of the drive circuit is connected to an input end of the load element, for providing the load element with an operating voltage.

In an embodiment, the pulse circuit includes: a D trigger, an output end of the D trigger being connected to the switch circuit; an inverter, an input end of the inverter being connected to the output end of the D trigger, an output end of the inverter being connected to an input end of the D trigger; and a pulse generating unit connected to a clock input end of the D trigger, for generating a pulse signal with a third preset frequency.

In an embodiment, the feedback circuit includes: a comparison circuit connected to the load element, for receiving the feedback voltage, and generating the control signal in response that the feedback voltage is not within the preset voltage range; and an AND gate. An output end of the AND gate is connected to the switch circuit, a first input end of the AND gate is connected to an output end of the comparison circuit, the first input end of the AND gate is for accessing the control signal, a second input end of the AND gate is for accessing a setting signal, and the setting signal is at a high level or at a low level.

In an embodiment, an output of the AND gate is 0 in response that the setting signal is at the low level; or an output of the AND gate is 1 in response that the setting signal is at the high level.

In an embodiment, the feedback voltage includes a first feedback voltage and a second feedback voltage. The comparison circuit includes: a first comparator, an inverting input end of the first comparator being connected to an input end of the load element for accessing a first feedback voltage, a forward input end of the first comparator being accessed to a first reference voltage; a second comparator, an inverting input end of the second comparator being connected to an output end of the load element for accessing a second feedback voltage, a forward input end of the second comparator being accessed to a second reference voltage; and a OR gate, a first input end of the OR gate being connected to an output end of the first comparator, a second input end of the OR gate being connected to an output end of the second comparator, an output end of the OR gate being connected to the first input end of the AND gate.

In an embodiment, in response that the first feedback voltage is smaller than a first reference voltage and/or the second feedback voltage is smaller than a second reference voltage, an output of the OR gate is 1.

In an embodiment, the switch circuit includes a P-type metal oxide semiconductor (MOS) transistor, both a gate of the P-type MOS transistor and a drain of the P-type MOS transistor are connected to the output end of the AND gate, a drain of the P-type MOS transistor is connected to the control end of the switch tube, and a source of the P-type MOS transistor is connected to an output end of the pulse circuit.

In an embodiment, the switch power supply circuit includes the switch tube, a first inductor, a second inductor, a first capacitor, a second capacitor and a diode. A first end of the first inductor is respectively connected to a first end of the switch tube and a first end of the first capacitor, a second end of the first capacitor is respectively connected to an anode of the diode and a first end of the second inductor, a cathode of the diode is connected to a first end of the second capacitor, a second end of the switch tube, a second end of the second inductor and a second end of the second capacitor are all grounded, a control end of the switch tube is connected to the switch circuit, a second end of the first inductor is for assessing the first voltage, and the cathode of the diode is for supplying the second voltage to the load element.

In an embodiment, the drive circuit further includes a third capacitor. A first end of the third capacitor is connected to the second end of the first inductor, and a second end of the third capacitor is grounded.

In order to achieve the above objective, the present disclosure further provides a light-emitting circuit. The light-emitting circuit includes a mini-LED unit and the above-mentioned drive circuit. The output end of the drive circuit is connected to the input end of the mini-LED unit, the mini-LED unit acts as a load element of the drive circuit, and the drive circuit is used to provide a drive voltage for the mini-LED unit.

In an embodiment, the mini-LED unit includes a plurality of diodes, an anode of a first-stage diode is used as the input end of the mini-LED unit, and a cathode of a last-stage diode is used as the output end of the mini-LED unit.

In an embodiment, a first comparator in the feedback circuit is connected to the input end of the mini-LED unit, and a second comparator is connected to the output end of the mini-LED unit.

In order to achieve the above objective, the present disclosure further provides a display device, including the above-mentioned light-emitting circuit.

In the present disclosure, the drive circuit includes a switch power supply circuit, a feedback circuit, a pulse circuit and a switch circuit. The switch power supply circuit is for boosting or reducing a first voltage to obtain a second voltage, and supplying the second voltage to the load element. The feedback circuit is connected to the load element, for receiving a feedback voltage of the load element, and generating a control signal in response that the feedback voltage is not within a preset voltage range. The control signal is for controlling the switch tube to be in an on state or an off state. The pulse circuit is for generating a switch signal with a first preset frequency. The switch signal is for controlling the switch tube to switch between the on state or the off state according to a second preset frequency. The switch circuit is respectively connected to the feedback circuit, the pulse circuit and a control end of a switch tube. The switch circuit is for transmitting the control signal to the control end of the switch tube in response to receiving the control signal. The switch circuit is for transmitting the switch signal to the control end of the switch tube in response to not receiving the control signal. The feedback voltage of the load element is detected, thereby adjusting the switching frequency of the switch power supply circuit, and adjusting the output voltage of the switch power supply circuit, ensuring the stability of the voltage or current of the load element, and making the light-emitting element emit light more uniformly.

BRIEF DESCRIPTION OF THE DRAWINGS

In order to more clearly illustrate the technical solutions in the embodiments of the present disclosure, the following briefly introduces the accompanying drawings that need to be used in the description of the embodiments. Obviously, the drawings in the following description are only some embodiments of the present disclosure. For those of ordinary skill in the art, other drawings can also be obtained based on the structures shown in these drawings without any creative effort.

FIG. 3 is an equivalent circuit diagram of a switch power supply circuit in the present disclosure when the switch tube is turned on.

Figure 1:
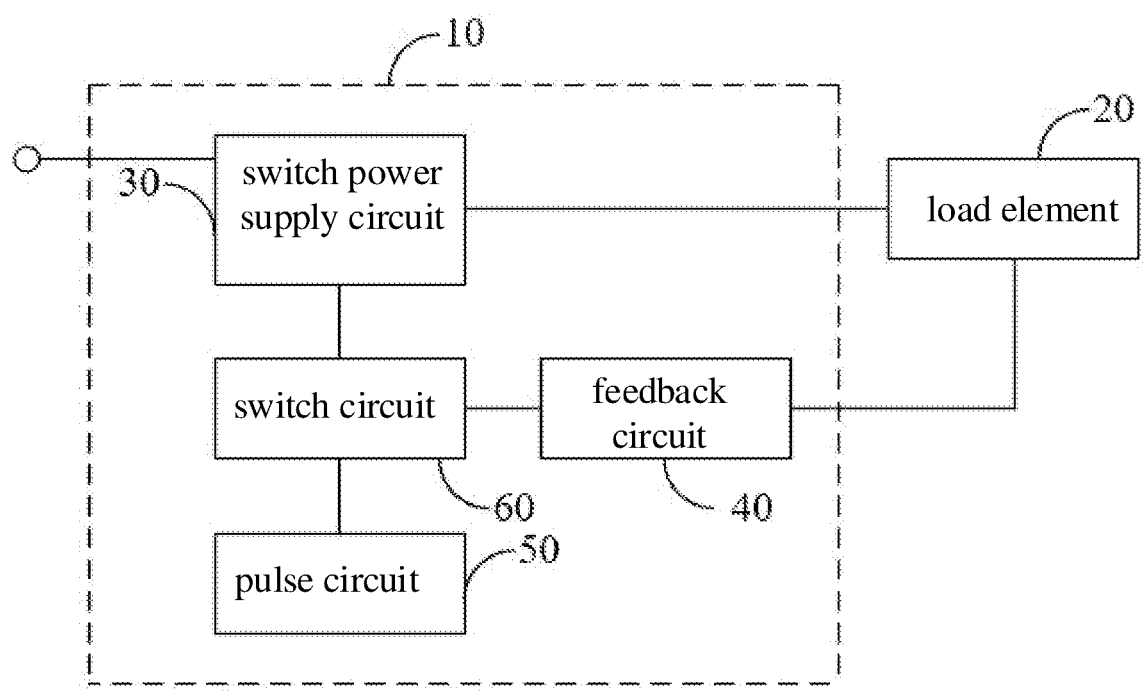
FIG. 1 is a structural block diagram of a drive circuit according to an embodiment of the present disclosure.

The realization of the objective, functional characteristics, and advantages of the present disclosure are further described with reference to the accompanying drawings.

DETAILED DESCRIPTION OF THE EMBODIMENTS

It should be understood that the specific embodiments described herein are only used to explain the present disclosure, but not to limit the present disclosure.

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

In addition, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. Besides, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

As shown in FIG. 1, FIG. 1 is a structural block diagram of a drive circuit according to an embodiment of the present disclosure.

As shown in FIG. 1, a drive circuit 10 is connected to a load element 20. The drive circuit 10 includes a switch power supply circuit 30, a feedback circuit 40, a pulse circuit 50 and a switch circuit 60. The switch power supply circuit 30 is for boosting or reducing a first voltage to obtain a second voltage, and supplying the second voltage to the load element 20. The feedback circuit 40 is connected to the load element 20, for receiving a feedback voltage of the load element 20, and generating a control signal in response that the feedback voltage 20 is not within a preset voltage range. The pulse circuit 50 is for generating a switch signal with a first preset frequency. The switch circuit 60 is respectively connected to the feedback circuit 40, the pulse circuit 50 and a control end of a switch tube K in the switch power supply circuit 30. The switch circuit 60 is for transmitting the control signal to the control end of the switch tube K in response to receiving the control signal. The switch circuit 60 is for transmitting the switch signal to the control end of the switch tube K in response to not receiving the control signal. The control signal is for controlling the switch tube K to be in an on state or an off state. The switch signal is for controlling the switch tube K to switch between the on state or the off state according to a second preset frequency.

In some embodiments, the load element 20 may be a light-emitting diode (LED) or a mini-LED component, and the mini-LED component may include a plurality of light-emitting diodes. The output end of the drive circuit 10 is connected to the input end of the load element 20 to provide the load element 20 with an operating voltage.

It should be noted that the light-emitting element such as the light-emitting diode or the mini-LED component is commonly used in the display circuit, such as to provide backlighting. Therefore, such elements require specific adjustable inputs to operate. When this type of load element 20 is operating, a corresponding voltage can be provided according to actual requirements. The purpose of this embodiment is to ensure that the input voltage of the load element 20 is stabilized at the operating voltage on the premise that the operating voltage of the load element 20 has been determined.

In order to meet the drive requirements of the load element 20, the drive circuit 10 mainly adopts the switch power supply circuit 30. The switch power supply circuit 30 may have a voltage regulation function, and includes a switch tube K and an energy storage element inside. The switch tube K is turned on and off in a certain period, and can play the role of boosting or reducing the voltage in cooperation with the energy storage element. Generally, when the on-time of the switch tube K is longer than the off-time of the switch tube K, the switch power supply circuit 30 operates in the boost region, and the second voltage is greater than the first voltage. The longer the on-time of the switch tube K, the greater the boosting effect. When the on-time of the switch tube K is shorter than the off-time of the switch tube K, the switch power supply circuit 30 operates in the voltage reduction region, and the second voltage is less than the first voltage. The shorter the on-time of the switch tube K, the greater the voltage reduction effect.

The feedback voltage may be a voltage at the input end of the load element 20 and/or a voltage at the output end of the load element 20. If the feedback voltage is within the preset voltage range, it means that the voltage or current of the load element 20 is relatively stable and does not need to be adjusted. If the feedback voltage is not within the preset voltage range, it means that the voltage or current of the load element 20 fluctuates. When it is detected that the feedback voltage is less than the preset voltage, in order to increase the second voltage, the switch tube K can be controlled to maintain the on state to increase the ratio of the on-time to the off-time of the switch tube K, and improve the boosting effect or reduce the voltage reduction effect. When it is detected that the feedback voltage is greater than the preset voltage, to reduce the second voltage, the switch tube K can be controlled to maintain the off state to reduce the ratio of the on-time to off-time of the switch tube K to reduce the boosting effect or increase the voltage reduction effect.

It should be noted that the control signal can be at a high or a low level. If the control end of the switch tube K is turned on when it is at a high level, when the second voltage needs to be increased, the control signal is at a high level; when the second voltage needs to be lowered, the control signal is at a low level. If the control end of the switch tube K is turned on when it is at a low level, when the second voltage needs to be increased, the control signal is at the low level; when the second voltage needs to be decreased, the control signal is at the high level.

The switch signal has a high-level phase and a low-level phase, and the switch signal switches between the high-level phase and the low-level phase according to a second preset frequency. The second preset frequency is theoretically calculated according to the required operating voltage of the load element.

The switch circuit 60 is for controlling the voltage accessed to the control end of the switch tube K. Since the feedback circuit 40 generates the control signal only when the feedback voltage 20 is not within the preset voltage range, the control of the switch circuit 60 can be linked with the output of the feedback circuit 40. When the feedback voltage 20 is within the preset voltage range, it means that the second voltage accessed to the load element 20 is within the normal range. At this time, the switch power supply circuit 30 can operate according to the set frequency, that is, the control end of the switch tube K receives the switch signal. When the feedback voltage 20 is not within the preset voltage range, it means that the second voltage accessed to the load element 20 is not within the normal range and needs to be corrected. Therefore, the control end of the switch tube K is connected to the control signal to adjust the second voltage.

Figure 2:
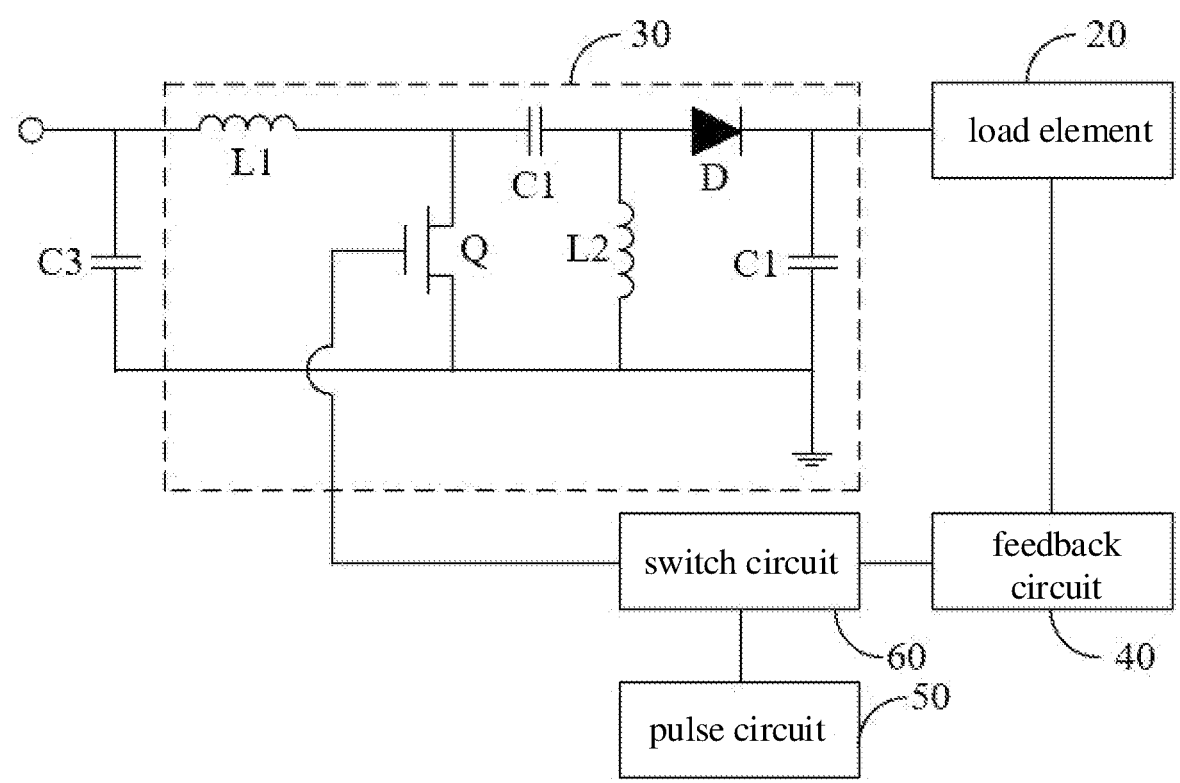
FIG. 2 is a circuit schematic diagram of the drive circuit according to an embodiment of the present disclosure.

As an example, as shown in FIG. 2, FIG. 2 is a circuit schematic diagram of the drive circuit according to an embodiment of the present disclosure. The switch power supply circuit 30 includes a switch tube K, a first inductor L1, a second inductor L2, a first capacitor C1, a second capacitor C2 and a diode D. A first end of the first inductor L1 is respectively connected to a first end of the switch tube K and a first end of the first capacitor C1. A second end of the first capacitor L1 is respectively connected to an anode of the diode D and a first end of the second inductor L2. A cathode of the diode D is connected to a first end of the second capacitor C2. A second end of the switch tube K, a second end of the second inductor L2 and a second end of the second capacitor C2 are all grounded. A control end of the switch tube K is connected to the switch circuit 60. A second end of the first inductor L1 is for assessing the first voltage. The cathode of the diode D is for supplying the second voltage to the load element 20.

Figure 3:
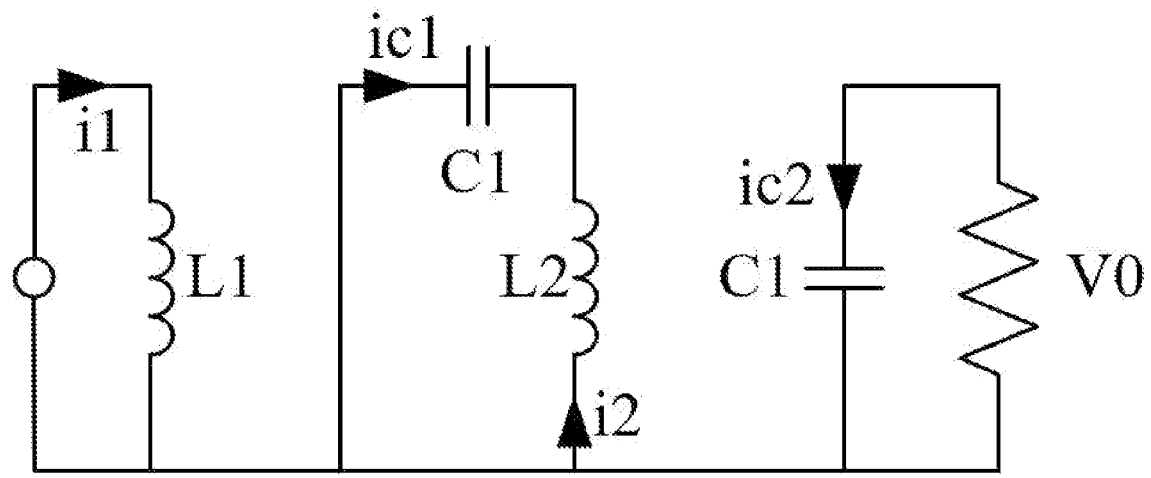
Figure 4:
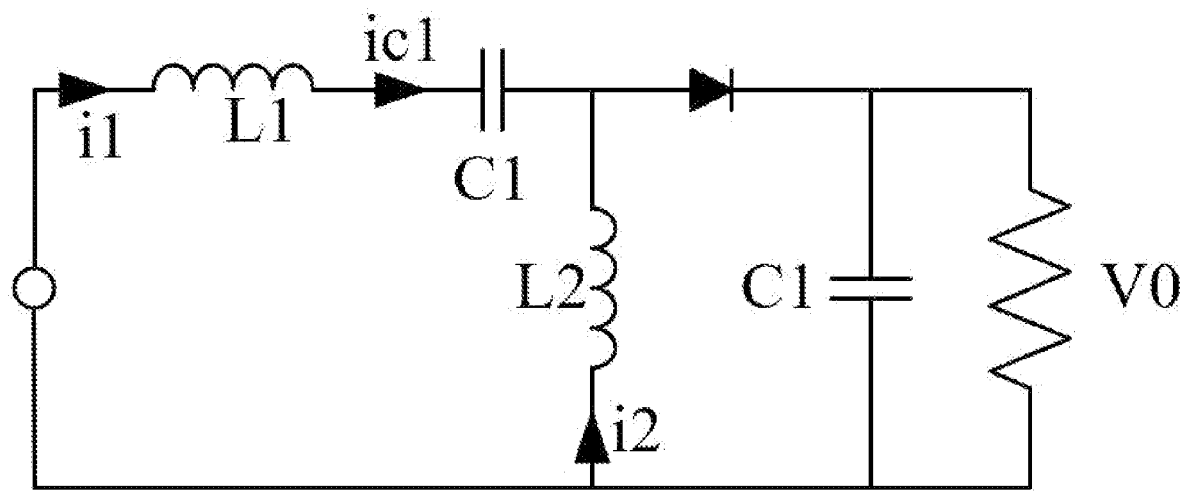
FIG. 4 is an equivalent circuit diagram of the switch power supply circuit in the present disclosure when the switch tube is turned off.

In order to illustrate the working principle of the switch power supply circuit 30 in this embodiment, referring to FIG. 3 and FIG. 4, FIG. 3 is an equivalent circuit diagram of the switch power supply circuit in the present disclosure when the switch tube is turned on, and FIG. 4 is an equivalent circuit diagram of the switch power supply circuit in the present disclosure when the switch tube is turned off.

The circuit equation corresponding to the circuit shown in FIG. 3 is:

$$\begin{cases} V_{L1} = V_g \\ V_{L2} = V_{C1} \\ i_{C1} = -i_2 \\ i_{C2} = -\dfrac{V_0}{R} \end{cases}$$

The circuit equation corresponding to the circuit shown in FIG. 4 is:

$$\begin{cases} V_g - V_{L1} - V_{C1} - V_0 = 0 \\ V_{L2} = -V_0 \\ i_{C1} = i_1 \\ i_{C2} = i_1 + i_2 - \dfrac{V_0}{R} \end{cases}$$

R is a resistance of the load element 20, $V_O$ is a voltage value of the second voltage, and $V_g$ is a voltage value of the first voltage. According to the volt-second balance principle of the inductor, the followings can be obtained.

$$D*V_g+(1-D)*(V_g-V_O-V_{C1})=0 \quad (1)$$

$$D*V_{C1}+(1-D)*(-V_O)=0 \quad (2)$$

D is the ratio of the on-time of the switch tube K to the total cycle time in one cycle. It can be obtained from the above two equations:

$$V_{C1}=V_g \quad (3)$$

Equation (3) is substituted into equation (1), the following can be obtained:

$$V_O=(D/1-D)V_g \quad (4)$$

It can be seen that when D is greater than ½, the circuit is a boost circuit, and when D is less than ½, the circuit is a voltage reduction circuit.

In this embodiment, the drive circuit 10 further includes a third capacitor C3, the first end of the third capacitor C3 is connected to the second end of the first inductor L1, and the second end of the third capacitor C3 is grounded.

It can be understood that the third capacitor C3 can play a role of voltage regulation, which can eliminate the fluctuation of the first voltage, and further ensure the stability of the operating voltage of the load element 20. In addition, the first capacitor C1 can play the role of isolation, and the first inductor can also play the role of absorbing current, thereby preventing excessive direct current from damaging the circuit.

In this embodiment, the drive circuit 10 includes a switch power supply circuit 30, a feedback circuit 40, a pulse circuit 50 and a switch circuit 60. The feedback circuit 40 is connected to the load element 20, for receiving a feedback voltage of the load element 20, and generating a control signal in response that the feedback voltage is not within a preset voltage range. The pulse circuit 50 is for generating a switch signal with a first preset frequency. The switch circuit 60 is respectively connected to the feedback circuit 40, the pulse circuit 50 and a control end of a switch tube K. The switch circuit 60 is for transmitting the control signal to the control end of the switch tube K in response to receiving the control signal. The switch circuit 60 is for transmitting the switch signal to the control end of the switch tube K in response to not receiving the control signal. The feedback voltage of the load element 20 is detected, thereby adjusting the switching frequency of the switch power supply circuit 30, and adjusting the output voltage of the switch power supply circuit 30, ensuring the stability of the voltage or current of the load element 20, and making the light-emitting element emit light more uniformly.

Figure 5:
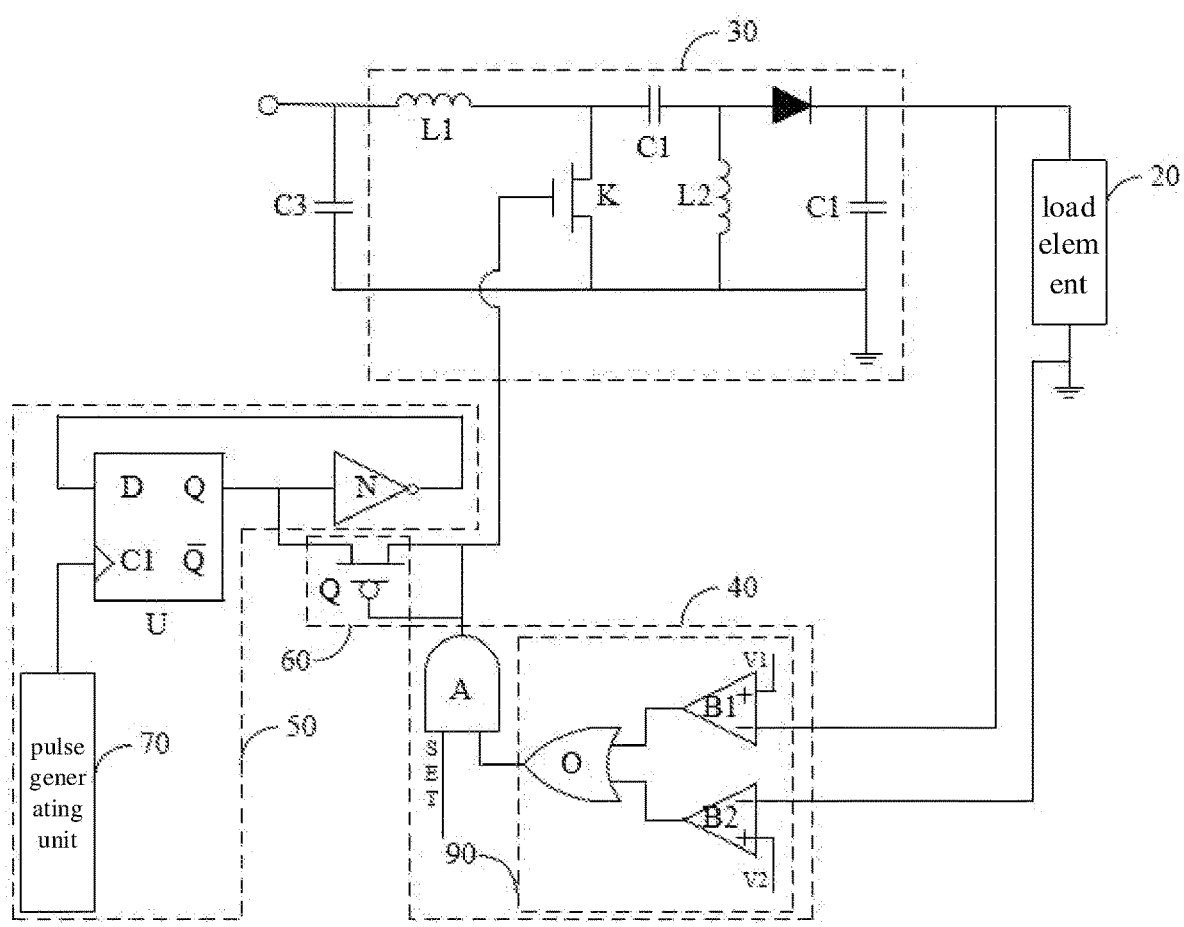
FIG. 5 is a circuit schematic diagram of the drive circuit according to an embodiment of the present disclosure.

As shown in FIG. 5, FIG. 5 is a circuit schematic diagram of the drive circuit according to an embodiment of the present disclosure.

In this embodiment, the pulse circuit 50 includes a D trigger U, an inverter N and a pulse generating unit 70. An output end of the D trigger U is connected to the switch circuit 60. An input end of the inverter N is connected to the output end of the D trigger U. An output end of the inverter N is connected to an input end of the D trigger U. The pulse generating unit 70 is connected to a clock input end of the D trigger U, for generating a pulse signal with a third preset frequency.

It should be noted that D trigger U is edge-triggered. Since the output end of the D trigger U is connected to the input end through the inverter N. Therefore, when the clock input end receives a rising edge signal, the output end of the D trigger U is inverted once. There are mature technologies for adjusting the pulse generating unit 70, and details are not described herein in this embodiment.

The feedback circuit 40 includes a comparison circuit 80 and an AND gate A. The comparison circuit 80 is connected to the load element 20, for receiving the feedback voltage, and generating the control signal in response that the feedback voltage is not within the preset voltage range. An output end of the AND gate A is connected to the switch circuit 60, a first input end of the AND gate A is connected to an output end of the comparison circuit 80, the first input end of the AND gate A is for accessing the control signal, a second input end of the AND gate A is for accessing a setting signal, and the setting signal is at a high level or at a low level.

It can be understood that when the setting signal is at a low level (i.e., 0), the output of the AND gate A is 0 regardless of whether the output of the comparison circuit 80 is 1 or 0. When the setting signal is at a high level (i.e., 1), and the output of the comparison circuit 80 is also 1, the output of the AND gate A is 1. Therefore, the output of the comparison circuit 80 can be limited by adjusting the level of the setting signal. When the setting signal is at a low level (i.e., 0), the output of the comparison circuit 80 is not limited; when the setting signal is at a high level (i.e., 1), the output of the comparison circuit 80 is limited. Thus, switching control of the voltage stabilization function required to be realized in this embodiment can be realized, and the voltage stabilization function refers to a function of adjusting the second voltage when the voltage of the load element 20 fluctuates.

In this embodiment, in order to adjust the voltage of the load element 20 more accurately, the feedback voltage may include a first feedback voltage and a second feedback voltage. The comparison circuit may include a first comparator B1 and a second comparator B2. An inverting input end of the first comparator B1 is connected to an input end of the load element 20 for accessing a first feedback voltage. A forward input end of the first comparator B1 is accessed to a first reference voltage. An inverting input end of the second comparator B2 is connected to an output end of the load element 20 for accessing a second feedback voltage. A forward input end of the second comparator B2 is accessed to a second reference voltage. A first input end of the OR gate O is connected to an output end of the first comparator B1, a second input end of the OR gate O is connected to an output end of the second comparator B2, and an output end of the OR gate O is connected to the first input end of the AND gate.

It should be noted that the specific values of the first reference voltage and the second reference voltage can be set according to requirements. When the first feedback voltage is smaller than the first reference voltage and/or the second feedback voltage is smaller than the second reference voltage, the output of the OR gate O is 1. If the setting signal is at a high level, the output of AND gate A is 1. It can be considered that the switch circuit 60 receives the control signal. Although this embodiment only provides the output control signal when the voltage of the load element 20 is less than the reference voltage, the circuit diagram for outputting the control signal when the voltage of the load element 20 is greater than the reference voltage can be adjusted according to the above circuit.

In order to facilitate the control of the control signal and the switch signal, the switch circuit 60 includes a P-type metal oxide semiconductor (MOS) transistor Q, both a gate of the P-type MOS transistor Q and a drain of the P-type MOS transistor Q are connected to the output end of the AND gate A, a drain of the P-type MOS transistor Q is connected to the control end of the switch tube K, and a source of the P-type MOS transistor Q is connected to an output end of the pulse circuit 50.

It can be understood that when the output of AND gate A is 1, the gate of the P-type MOS transistor Q is at a high level, and the P-type MOS transistor is turned off. The output of the D trigger cannot reach the control end of the switch tube K, and the output of the AND gate A is directly applied to the control end of the switch tube K. The control end of the switch tube K is at a high level, and the switch tube K remains in a conducting state.

In this embodiment, the feedback circuit 40 generates a control signal when the feedback voltage is not within the preset voltage range. The pulse circuit 50 generates a switch signal with a third preset frequency. The switch circuit 60 transmits the control signal to the control end of the switch tube K when receiving the control signal, and transmits the switch signal to the control end of the switch tube K when not receiving the control signal. The voltage compensation is realized to ensure the stability of the voltage of the load element 20.

Figure 6:
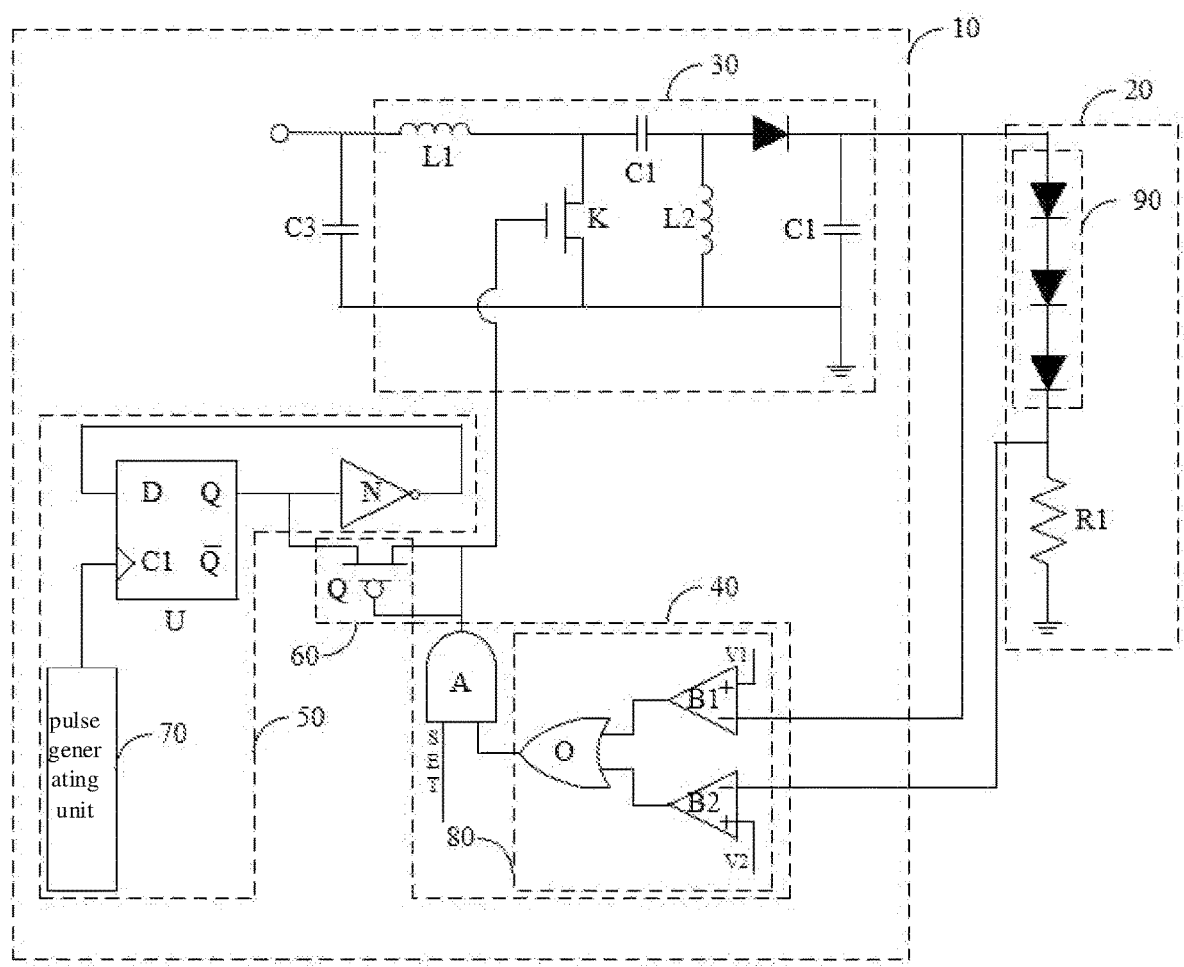
FIG. 6 is a circuit schematic diagram of a light-emitting circuit according to an embodiment of the present disclosure.

In order to achieve the above objective, based on the above embodiment, the present disclosure further provides a light-emitting circuit. As shown in FIG. 6, FIG. 6 is a circuit schematic diagram of the light-emitting circuit according to an embodiment of the present disclosure. The light-emitting circuit includes a mini-LED unit 90 and the drive circuit 10 as described above. The output end of the drive circuit 10 is connected to the input end of the mini-LED unit 90. The mini-LED unit 90 serves as the load element 20 of the drive circuit. The drive circuit 10 is for providing a drive voltage for the mini-LED unit 90. The mini-LED unit 90 includes a plurality of diodes. The anode of the first-stage diode serves as the input end of the mini-LED unit 90, and the cathode of the last-stage diode serves as the output end of the mini-LED unit 90. The output end of the mini-LED unit 90 may be grounded through the resistor R. The first comparator B1 in the feedback circuit 40 may be connected to the input end of the mini-LED unit 90, and the second comparator B2 may be connected to the output end of the mini-LED unit 90. The feedback circuit 40 can adjust the voltage output by the drive circuit 10 when it is detected that the voltage at the input end and the voltage at the output end of the mini-LED unit 90 fluctuates. Since the light-emitting circuit can adopt the technical solutions of all the above-mentioned embodiments, it has at least the beneficial effects brought about by the technical solutions of the above-mentioned embodiments, which will not be repeated here.

In order to achieve the above objective, the present disclosure further provides a display device. The display device includes the light-emitting circuit as described above. The specific structure of the light-emitting circuit refers to the above-mentioned embodiment. Since the display device can adopt the technical solutions of all the above-mentioned embodiments, it has at least the beneficial effects brought by the technical solutions of the above-mentioned embodiments, which will not be repeated herein.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A drive circuit connected to a load element, comprising:
   a switch power supply circuit for boosting or reducing a first voltage to obtain a second voltage, and supplying the second voltage to the load element;
   a feedback circuit connected to the load element, for receiving a feedback voltage of the load element, and generating a control signal in response that the feedback voltage is not within a preset voltage range;
   a pulse circuit for generating a switch signal with a first preset frequency; and
   a switch circuit respectively connected to the feedback circuit, the pulse circuit and a control end of a switch tube in the switch power supply circuit,
   wherein the switch circuit is for transmitting the control signal to the control end of the switch tube in response to receiving the control signal, the switch circuit is for transmitting the switch signal to the control end of the switch tube in response to not receiving the control signal, the control signal is for controlling the switch tube to be in an on state or an off state, and the switch signal is for controlling the switch tube to switch between the on state or the off state according to a second preset frequency.

2. The drive circuit of claim 1, wherein the load element is a light emitting diode (LED) or a mini-LED component.

3. The drive circuit of claim 1, wherein an output end of the drive circuit is connected to an input end of the load element, for providing the load element with an operating voltage.

4. The drive circuit of claim 1, wherein the pulse circuit comprises:
   a D trigger, an output end of the D trigger being connected to the switch circuit;
   an inverter, an input end of the inverter being connected to the output end of the D trigger, an output end of the inverter being connected to an input end of the D trigger; and
   a pulse generating unit connected to a clock input end of the D trigger, for generating a pulse signal with a third preset frequency.

5. The drive circuit of claim 1, wherein the feedback circuit comprises:
   a comparison circuit connected to the load element, for receiving the feedback voltage, and generating the control signal in response that the feedback voltage is not within the preset voltage range; and
   an AND gate,
   wherein an output end of the AND gate is connected to the switch circuit, a first input end of the AND gate is connected to an output end of the comparison circuit, the first input end of the AND gate is for accessing the control signal, a second input end of the AND gate is for accessing a setting signal, and the setting signal is at a high level or at a low level.

6. The drive circuit of claim 5, wherein:
   an output of the AND gate is 0 in response that the setting signal is at the low level; or
   an output of the AND gate is 1 in response that the setting signal is at the high level.

7. The drive circuit of claim 5, wherein:
   the feedback voltage comprises a first feedback voltage and a second feedback voltage,
   the comparison circuit comprises:

a first comparator, an inverting input end of the first comparator being connected to an input end of the load element for accessing a first feedback voltage, a forward input end of the first comparator being accessed to a first reference voltage;

a second comparator, an inverting input end of the second comparator being connected to an output end of the load element for accessing a second feedback voltage, a forward input end of the second comparator being accessed to a second reference voltage; and a OR gate, a first input end of the OR gate being connected to an output end of the first comparator, a second input end of the OR gate being connected to an output end of the second comparator, an output end of the OR gate being connected to the first input end of the AND gate.

8. The drive circuit of claim 7, wherein in response that the first feedback voltage is smaller than a first reference voltage and/or the second feedback voltage is smaller than a second reference voltage, an output of the OR gate is 1.

9. The drive circuit of claim 5, wherein the switch circuit comprises a P-type metal oxide semiconductor (MOS) transistor, both a gate of the P-type MOS transistor and a drain of the P-type MOS transistor are connected to the output end of the AND gate, a drain of the P-type MOS transistor is connected to the control end of the switch tube, and a source of the P-type MOS transistor is connected to an output end of the pulse circuit.

10. The drive circuit of claim 1, wherein:
the switch power supply circuit comprises the switch tube, a first inductor, a second inductor, a first capacitor, a second capacitor and a diode,
a first end of the first inductor is respectively connected to a first end of the switch tube and a first end of the first capacitor,
a second end of the first capacitor is respectively connected to an anode of the diode and a first end of the second inductor,
a cathode of the diode is connected to a first end of the second capacitor,
a second end of the switch tube, a second end of the second inductor and a second end of the second capacitor are all grounded,
a control end of the switch tube is connected to the switch circuit,
a second end of the first inductor is for assessing the first voltage, and
the cathode of the diode is for supplying the second voltage to the load element.

11. The drive circuit of claim 10, further comprising:
a third capacitor,
wherein a first end of the third capacitor is connected to the second end of the first inductor, and a second end of the third capacitor is grounded.

12. A light-emitting circuit, comprising:
a mini-light emitting diode (mini-LED) unit; and
a drive circuit connected to a load element, and comprising:
a switch power supply circuit for boosting or reducing a first voltage to obtain a second voltage, and supplying the second voltage to the load element;
a feedback circuit connected to the load element, for receiving a feedback voltage of the load element, and generating a control signal in response that the feedback voltage is not within a preset voltage range;
a pulse circuit for generating a switch signal with a first preset frequency; and
a switch circuit respectively connected to the feedback circuit, the pulse circuit and a control end of a switch tube in the switch power supply circuit,
wherein the switch circuit is for transmitting the control signal to the control end of the switch tube in response to receiving the control signal, the switch circuit is for transmitting the switch signal to the control end of the switch tube in response to not receiving the control signal, the control signal is for controlling the switch tube to be in an on state or an off state, and the switch signal is for controlling the switch tube to switch between the on state or the off state according to a second preset frequency;
wherein an output end of the drive circuit is connected to an input end of the mini-LED unit, the mini-LED unit is used as the load element of the drive circuit, and the drive circuit is for providing a drive voltage for the mini-LED unit.

13. The light-emitting circuit of claim 12, wherein the mini-LED unit comprises a plurality of diodes, an anode of a first-stage diode is used as the input end of the mini-LED unit, and a cathode of a last-stage diode is used as the output end of the mini-LED unit.

14. The light-emitting circuit of claim 12, wherein a first comparator in the feedback circuit is connected to the input end of the mini-LED unit, and a second comparator is connected to the output end of the mini-LED unit.

15. A display device, comprising:
a light-emitting circuit, comprising:
a mini-light emitting diode (mini-LED) unit; and
a drive circuit connected to a load element, and comprising:
a switch power supply circuit for boosting or reducing a first voltage to obtain a second voltage, and supplying the second voltage to the load element;
a feedback circuit connected to the load element, for receiving a feedback voltage of the load element, and generating a control signal in response that the feedback voltage is not within a preset voltage range;
a pulse circuit for generating a switch signal with a first preset frequency; and
a switch circuit respectively connected to the feedback circuit, the pulse circuit and a control end of a switch tube in the switch power supply circuit,
wherein the switch circuit is for transmitting the control signal to the control end of the switch tube in response to receiving the control signal, the switch circuit is for transmitting the switch signal to the control end of the switch tube in response to not receiving the control signal, the control signal is for controlling the switch tube to be in an on state or an off state, and the switch signal is for controlling the switch tube to switch between the on state or the off state according to a second preset frequency;
wherein an output end of the drive circuit is connected to an input end of the mini-LED unit, the mini-LED unit is used as the load element of the drive circuit, and the drive circuit is for providing a drive voltage for the mini-LED unit.

* * * * *